(12) United States Patent
Bax et al.

(10) Patent No.: US 11,502,617 B2
(45) Date of Patent: Nov. 15, 2022

(54) GENERATOR SYSTEMS AND CONTROLLERS

(71) Applicant: Hamilton Sundstrand Corporation, Charlotte, NC (US)

(72) Inventors: Randall Bax, Rockton, IL (US); Dwight D. Schmitt, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 433 days.

(21) Appl. No.: 16/271,330

(22) Filed: Feb. 8, 2019

(65) Prior Publication Data

US 2020/0259422 A1 Aug. 13, 2020

(51) Int. Cl.
*H02M 5/458* (2006.01)

(52) U.S. Cl.
CPC ................................ *H02M 5/4585* (2013.01)

(58) Field of Classification Search
CPC ............ H02M 5/40; H02M 5/42; H02M 5/45; H02M 5/451; H02M 1/12; H02M 1/4266; H02M 1/14; H02M 5/4585; H02J 3/01
USPC ...................................................... 363/34–41
See application file for complete search history.

(56) References Cited

U.S. PATENT DOCUMENTS

| | | | |
|---|---|---|---|
| 4,935,859 A | 6/1990 | Kirchberg et al. | |
| 5,043,857 A | 8/1991 | Kirchberg, Jr. et al. | |
| 5,327,335 A | 7/1994 | Maddali et al. | |
| 5,383,107 A | 1/1995 | Hopkins et al. | |
| 5,438,502 A | 8/1995 | Rozman et al. | |
| 6,134,127 A | 10/2000 | Kirchberg | |
| 10,003,186 B2 | 6/2018 | Wagner et al. | |
| 2014/0292238 A1* | 10/2014 | Furukawa | B60L 3/003 318/400.02 |
| 2014/0307488 A1* | 10/2014 | Brogan | H02M 5/4585 363/35 |
| 2014/0328092 A1* | 11/2014 | Yokokawa | H02M 7/53875 363/41 |

FOREIGN PATENT DOCUMENTS

EP 2977848 A1 1/2016

OTHER PUBLICATIONS

Extended European search report issued in corresponding EP Application No. 19215979.6, dated Apr. 6, 2020.

* cited by examiner

*Primary Examiner* — Nguyen Tran
(74) *Attorney, Agent, or Firm* — Locke Lord LLP; Scott D. Wofsy; Daniel J. Fiorello

(57) ABSTRACT

A generator system can include a generator configured to produce an output of alternating current (AC), a rectifier connected to the generator to rectify the AC into direct current (DC) rectifier output, an inverter connected to the rectifier to receive the DC rectifier output and configured to output three phase AC inverter output, and a plurality of output lines connected to the inverter to receive the three phase AC inverter output. The system can include a control module configured to control the output of the inverter. The control module can be operatively connected to one or more of the output lines via one or more local sense leads to receive a local feedback. The control module can be configured to control the inverter as a function of the local feedback to provide one or more of protection, voltage regulation, or harmonic correction.

10 Claims, 2 Drawing Sheets

GENERATOR SYSTEMS AND CONTROLLERS

BACKGROUND

1. Field

This disclosure relates to generator systems and controllers therefore.

2. Description of Related Art

Traditional generator systems regulate the output voltage at an externally connected point of reference or regulation (POR). The typical implementation for feedback is directly at the POR. Because of the nature of the architecture, generator harmonics cannot be controlled or mitigated in existing systems, and the generator output voltage is regulated only at fundamental.

Such conventional methods and systems have generally been considered satisfactory for their intended purpose. However, there is still a need in the art for improved generator systems and controllers therefor. The present disclosure provides a solution for this need.

SUMMARY

A generator system can include a generator configured to produce an output of alternating current (AC), a rectifier connected to the generator to rectify the AC into direct current (DC) rectifier output, an inverter connected to the rectifier to receive the DC rectifier output and configured to output three phase AC inverter output, and a plurality of output lines connected to the inverter to receive the three phase AC inverter output. The system can include a control module configured to control the output of the inverter. The control module can be operatively connected to one or more of the output lines via one or more local sense leads to receive a local feedback. The control module can be configured to control the inverter as a function of the local feedback to provide one or more of protection, voltage regulation, or harmonic correction.

The control module can also be connected to one or more point of reference (POR) leads configured to be connected to a POR on a plurality of load input lines of a load to provide POR feedback to the control module. The control module can be configured to adjust the inverter output to account for voltage drops between the one or more output lines and the one or more input lines or due to a contactor between the one or more input and output lines as a function of the POR feedback.

The control module can include an RMS creation module configured to receive POR feedback voltage in a wave form and to convert the POR feedback into an RMS value. The control module can include an RMS reference module configured to output an RMS reference.

The control module can include a voltage reference generation module operatively connected to the RMS creation module and the RMS reference module to compare the RMS value to the RMS reference to determine a voltage drop at the POR. The control module can include a protection control module configured to receive POR feedback current and local feedback voltage and current to protect the inverter and/or the load from overvoltage or overcurrent. The control module can include an inverter control module having an output voltage harmonic regulator module configured to receive the local feedback and remove harmonics from the inverter output.

In accordance with at least one aspect of this disclosure, a controller for a generator system can include a control module configured to control output of an inverter, wherein the control module is configured to be operatively connected to one or more output lines of the generator system via one or more local sense leads to receive a local feedback, wherein the control module is configured to control the inverter as a function of the local feedback to provide one or more of protection, voltage regulation, or harmonic correction. The control module can include any suitable control module disclosed herein (e.g., as described above).

A method can include receiving a local feedback from an output line of a generator system, and controlling an output of the generator system to correct harmonics of the output as a function of the local feedback. The method can include receiving a point of reference (POR) feedback from an input line of a load. The method can include controlling the output of the generator system to correct voltage drop at the load as a function of the POR feedback.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
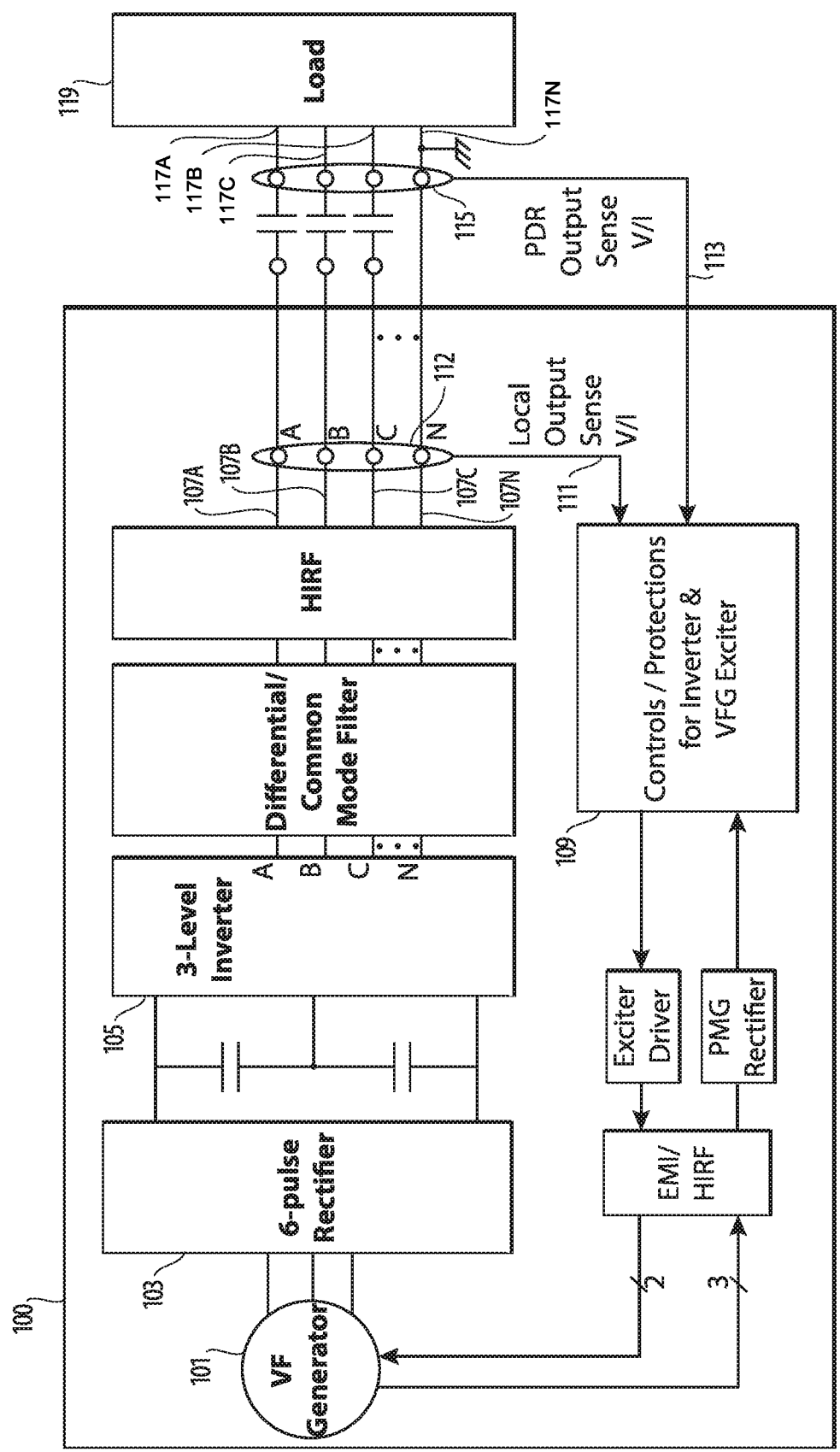
FIG. 1 is a schematic diagram of an embodiment of a generator system in accordance with this disclosure.
Figure 2:
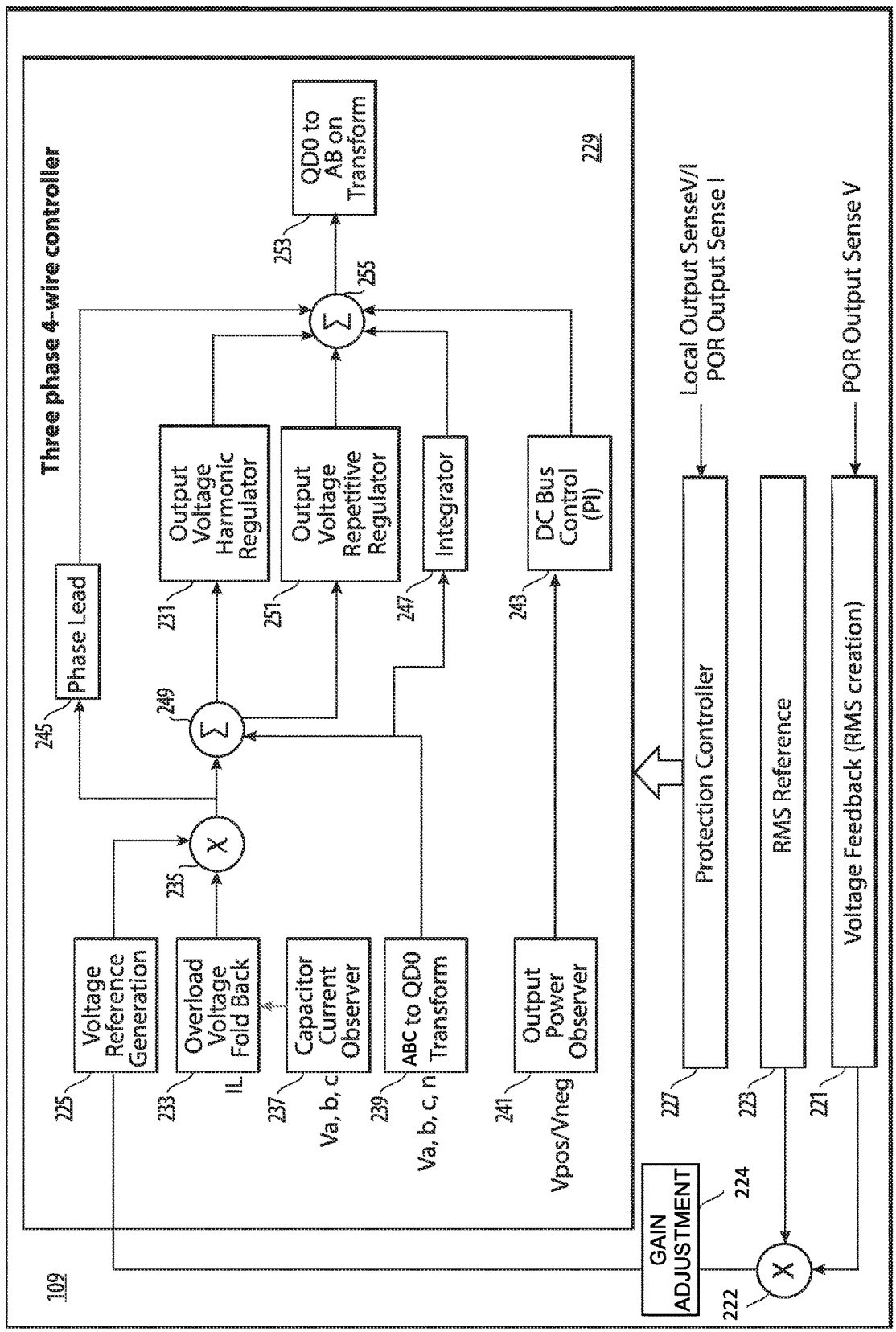
FIG. 2 is a schematic diagram of an embodiment of a control module in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

A generator system 100 can include a generator 101 configured to produce an output of alternating current (AC). The generator 101 can be any suitable type of generator (e.g., a variable frequency (VF) or variable speed constant frequency (VSCF) generator).

The system 100 can include a rectifier 103 connected to the generator 101 to rectify the AC from the generator 101 into direct current (DC) rectifier output. The rectifier 103 can be any suitable rectifier type. In certain embodiments, the rectifier 103 can be a 6 pulse rectifier.

The system 100 can include an inverter 105 connected to the rectifier 103 to receive the DC rectifier output and configured to output three phase AC inverter output. The system 100 can include a plurality of output lines 107A, B, C, N, connected to the inverter 105 (directly or indirectly through one or more generator system components, e.g., a differential/common mode filter (CMF) and/or a high intensity radiated field (HIRF) device) to receive the three phase AC inverter output.

The system 100 can include a control module 109 configured to control the output of the inverter 105. The control module 109 can be operatively connected to one or more of the output lines 107A, B, C, N via one or more local sense leads 111 (e.g., one for each output line such that there is one for each phase of the 3 phase AC inverter output) attached at a local sense location 112 to receive a local feedback. The control module 109 can be configured to control the inverter 105 as a function of the local feedback to provide one or more of protection, voltage regulation, or harmonic correction (e.g., any one alone, all of the above, or any combination thereof). In certain embodiments, the local sense location 112 can be after all output modifying components (e.g., the CMF and the HIRF as shown) of the system 100 as shown. Any other suitable local location within the system 100 is contemplated herein (e.g., between the CMF and the HIRF).

In certain embodiments, the control module 109 can also be connected to one or more point of reference (POR) leads 113 configured to be connected to a POR 115 on a plurality of load input lines 117A, B, C, N of a load 119 (e.g., aircraft electronics) to provide POR feedback to the control module 109. The control module 109 can be configured to adjust the inverter output to account for voltage drops between the one or more output lines 107A, B, C, N and the one or more input lines 117A, B, C, N and/or due to a contactor between the one or more input and output lines as a function of the POR feedback.

Referring additionally to FIG. 2, the control module 109 can include an RMS creation module 221 configured to receive POR feedback voltage in a wave form (e.g., fundamental) and to convert the POR feedback into an RMS value. The control module 109 can include an RMS reference module 223 configured to output an RMS reference value (e.g., from 0 to 1 PU (Per Unit)).

The control module 109 can include a voltage reference generation module 225 operatively connected to the RMS creation module 221 and the RMS reference 223 module to compare the RMS value to the RMS reference to determine a voltage drop at the POR 115, for example. In certain embodiments, the voltage reference generation module can be a sinusoidal reference to cause the output waveform to be a sinusoidal wave. In certain embodiments, the control module 109 can include a protection control module 227 configured to receive POR feedback current and local feedback voltage and current to protect the inverter 105 and/or the load 119 from overvoltage or overcurrent.

In certain embodiments, e.g., as shown in FIG. 2, a value in PU can be input to the voltage reference generator module 225. For example, the reference voltage from the RMS reference module 223 can be multiplied by the voltage feedback from the RMS creation module 221 (e.g., at compare block 222) and product gain can be adjusted (e.g., 1+(1−feedback*ref)) at gain adjustment module 224. Embodiments can provide a scalar value to multiply the voltage reference generation 225 as shown.

As shown in FIG. 2, the control module 109 can include an inverter control module 229 having an output voltage harmonic regulator module 231 configured to receive the local feedback and remove harmonics from the inverter output, for example. The inverter control module 229 can be a 3 phase, 4 wire controller, for example, configured to operate a 3 phase, 4 wire inverter. Any suitable type of inverter 105 and/or inverter control module 229 is contemplated herein.

In certain embodiments, the inverter control module 229 can include an overload voltage fold back module 233 which can include receive inductor current IL that is measured at the local sense location 112. The voltage fold back module 233 can sense if current is too high at a voltage setting and reduce output voltage if needed, e.g., by outputting a value from 0 to 1 for example. The inverter control module 229 can include a capacitor current observer module 237 configured to receive a local voltage Va, b, c, for each respective output line 107A, B, C, for example. The observer module 237 can be configured to observe output capacitor current, for example, and can be configured to output a value to the overload voltage fold back module 233. The output from the overload voltage fold back module 233 and/or the capacitor current observer module 237 cam be multiplied with the output from the voltage reference generation module 225 at a compare block 235 to modify the voltage that is and output a modified voltage reference.

The inverter control module 229 can include a first transform module 239 configured to receive local Va, b, c, n, and transform the input to another coordinate system (e.g., qd0 as appreciated by those having ordinary skill in the art) for simplified control processing, for example. The inverter control module 229 can include an output power observer module 241 configured to receive Vpos/Vneg input and DC bus control module 243 configured to receive output from the output power observer module 241 to control the DC bus midpoint as appreciated by those having ordinary skill in the art in view of this disclosure.

The inverter control module 229 can include a phase lead module 245 connected to the compare block 235 to receive the modified voltage reference and to introduce phase compensation for inductor/capacitor arrangement in the system 100 as appreciated by those having ordinary skill in the art in view of this disclosure. The inverter control module 229 can include an integrator module 247 configured to receive the output from the first transform module 239 and to provide proportion gain, for example, as appreciated by those having ordinary skill in the art in view of this disclosure. The modified voltage reference and the output from the first transform module 239 can be output to a first sum block 249, the sum of which can be output to the harmonic regulator module 231 and any other suitable regulator modules (e.g., output voltage repetitive regulator module 251).

Outputs of the phase lead module 245, the one or more regulator modules 231, 251, the integrator module 247, and the DC bus control module 243 can be input to a second sum block 255, the sum of which can be output to a second transform module 253 configured to transform the output back to the initial coordinate system (e.g, a, b, c, n from qd0 as appreciated by those having ordinary skill in the art). The output from the second transform module 253 can be input into PWM modulation (e.g., using any suitable number of switches of the inverter). The control module 109 and/or the inverter control module 229 can include any other suitable modules for any other suitable function for example.

In accordance with at least one aspect of this disclosure, a controller for a generator system can include a control module configured to control output of an inverter, wherein the control module is configured to be operatively connected to one or more output lines of the generator system via one or more local sense leads to receive a local feedback, wherein the control module is configured to control the inverter as a function of the local feedback to provide one or more of protection, voltage regulation, or harmonic correction. The control module can include any suitable control module disclosed herein (e.g., as described above).

A method can include receiving a local feedback from an output line of a generator system, and controlling an output of the generator system to correct harmonics of the output as a function of the local feedback. The method can include receiving a point of reference (POR) feedback from an input line of a load. The method can include controlling the output of the generator system to correct voltage drop at the load as a function of the POR feedback.

Any suitable control module(s) to form an exciter controller for the generator 101 are contemplated herein. Any other suitable module(s) for any other suitable purpose are contemplated herein.

Embodiments can provide POR trim correction for VSCF generators. Embodiments can still include a POR feedback, but can have harmonic correction locally within the generator system (e.g., within the line replaceable unit (LRU) of the generator system). In certain embodiments, an RMS reference (e.g., 1 or 100%, e.g., PU) is compared to POR output voltage, voltage feedback estimates the RMS voltage of POR output and can act as gain adjustment to account for difference, and then voltage reference generation can use the value from RMS reference to account for voltage drop.

Traditionally, control would be based on this sensed voltage and current at the POR, which is outside of the product and is installed at the user level and no harmonic correction, was available. Embodiments, however, can use a VSCF configuration (3-level inverter (4-wire)) and add two points of feedback. The local feedback can be used for protection, voltage regulation, and the harmonic correction, for example. Additionally POR feedback can be used for adjustments at the load for voltage drops from feeder and contactor.

In certain embodiments, the process of RMS creation filters feedback reducing potential for external noise sources to interfere with controller. In certain embodiments, loss of POR sense leads will not cause failure of one or more controller loop(s). External component design influence of wire routing for POR sense leads is reduced and the LRU can be tested in a known configuration.

As will be appreciated by those skilled in the art, aspects of the present disclosure may be embodied as a system, method, or computer program product. Accordingly, aspects of this disclosure may take the form of an entirely hardware embodiment, an entirely software (including firmware, resident software, micro-code, etc.) embodiment, or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator system, comprising:
   a generator configured to produce an output of alternating current (AC);
   a rectifier connected to the generator to rectify the AC into direct current (DC) rectifier output;
   an inverter connected to the rectifier to receive the DC rectifier output and configured to output three phase AC inverter output;
   a plurality of output lines connected to the inverter to receive the three phase AC inverter output; and
   a control module configured to control the output of the inverter, wherein the control module is operatively connected to one or more of the output lines via one or more local sense leads to receive a local feedback, wherein the control module is configured to control the inverter as a function of the local feedback to provide one or more of protection, voltage regulation, or harmonic correction, wherein the control module is also connected to one or more point of reference (POR) leads configured to be connected to a POR on a plurality of load input lines of a load to provide POR feedback to the control module, wherein the control module is configured to adjust the inverter output to account for voltage drops between the one or more output lines and the one or more input lines or due to a contactor between the one or more input and output lines as a function of the POR feedback, wherein the control module includes an RMS creation module configured to receive a POR feedback voltage in a wave form and to convert the POR feedback into an RMS value.

2. The system of claim 1, wherein the control module includes an RMS reference module configured to output an RMS reference.

3. The system of claim 2, wherein the control module includes a voltage reference generation module operatively connected to the RMS creation module and the RMS reference module to compare the RMS value to the RMS reference to determine a voltage drop at the POR.

4. The system of claim 3, wherein the control module includes a protection control module configured to receive the POR feedback current and local feedback voltage and current to protect the inverter and/or the load from overvoltage or overcurrent.

5. The system of claim 1, wherein the control module includes an inverter control module having an output voltage harmonic regulator module configured to receive the local feedback and remove harmonics from the inverter output.

6. A controller for a generator system, comprising:
   a control module configured to control output of an inverter, wherein the control module is configured to be operatively connected to one or more output lines of the generator system via one or more local sense leads to receive a local feedback, wherein the control module is configured to control the inverter as a function of the local feedback to provide one or more of protection, voltage regulation, or harmonic correction, wherein the control module is configured to be connected to one or more point of reference (POR) leads configured to be connected to a POR on a plurality of load input lines of a load to provide POR feedback to the control module, wherein the control module is configured to adjust the inverter output to account for voltage drops between the one or more output lines and the one or more input lines or due to a contactor between the one or more input and output lines as a function of the POR feedback, wherein the control module includes an RMS creation module configured to receive a POR feedback voltage in a wave form and to convert the POR feedback into an RMS value.

7. The controller of claim 6, wherein the control module includes an RMS reference module configured to output an RMS reference.

8. The controller of claim 7, wherein the control module includes a voltage reference generation module operatively connected to the RMS creation module and the RMS reference module to compare the RMS value to the RMS reference to determine a voltage drop at the POR.

9. The controller of claim 8, wherein the control module includes a protection control module configured to receive the POR feedback current and local feedback voltage and current to protect the inverter and/or the load from overvoltage or overcurrent.

10. The controller of claim 6, wherein the control module includes an inverter control module having an output voltage harmonic regulator module configured to receive the local feedback and remove harmonics from the inverter output.

* * * * *